United States Patent [19]
Sato

[11] 4,413,888
[45] Nov. 8, 1983

[54] COMPACT PHOTOGRAPHIC OBJECTIVE

[75] Inventor: Yasuhisa Sato, Yokohama, Japan

[73] Assignee: Canon Kabushiki Kaisha, Tokyo, Japan

[21] Appl. No.: 335,468

[22] Filed: Dec. 29, 1981

[30] Foreign Application Priority Data

Jan. 13, 1981 [JP] Japan .................................. 56-3590

[51] Int. Cl.$^3$ .......................... G02B 9/34; G02B 13/18
[52] U.S. Cl. .................................... 350/432; 350/469
[58] Field of Search ............................... 350/432, 469

[56] References Cited
U.S. PATENT DOCUMENTS

| | | | |
|---|---|---|---|
| 3,951,523 | 4/1976 | Nishimoto | 350/432 |
| 3,998,527 | 12/1976 | Ikeda et al. | 350/432 |
| 4,359,271 | 11/1982 | Mihara | 350/432 |
| 4,368,956 | 1/1983 | Yamada et al. | 350/469 X |

FOREIGN PATENT DOCUMENTS

| | | | |
|---|---|---|---|
| 56-94317 | 7/1981 | Japan | 350/432 |
| 2036366 | 6/1980 | United Kingdom | 350/469 |

*Primary Examiner*—John K. Corbin
*Assistant Examiner*—Scott J. Sugarman
*Attorney, Agent, or Firm*—Toren, McGeady and Stanger

[57] ABSTRACT

The disclosed photographic objective includes, from front to rear, a first lens of meniscus form convex toward the front and having a positive refractive power, a second lens having a negative refractive power, a third lens having a positive refractive power, and a fourth lens of meniscus form which is concave toward the front and has a negative refractive power and whose front surface is aspheric, with the refractive power and configuration of each lens appropriately set to achieve compactness while permitting good correction of aberrations.

2 Claims, 15 Drawing Figures

(ASPHERIC SURFACE)
DIAPHRAGM (a)

(b)

SPHERICAL ABERRATION
SINE CONDITION   ASTIGMATISM   DISTORTION(%)

SPHERICAL ABERRATION
SINE CONDITION

ASTIGMATISM

DISTORTION(%)

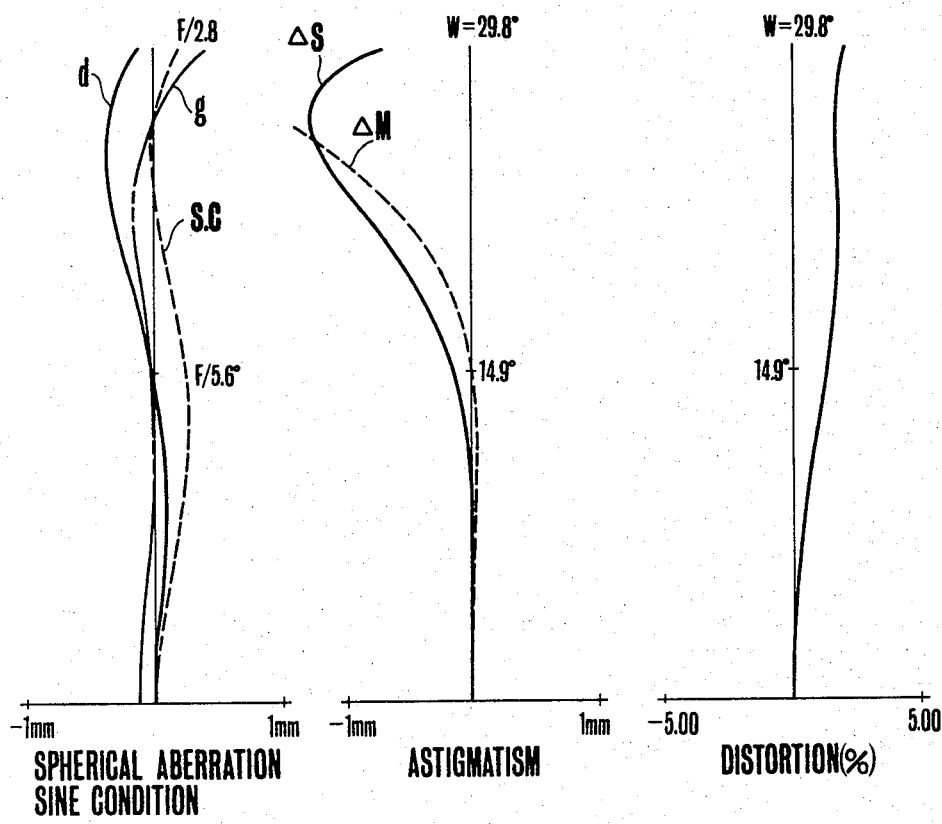

COMPACT PHOTOGRAPHIC OBJECTIVE

BACKGROUND OF THE INVENTION

1. Field of the Invention

This invention relates to photographic fast wide angle objectives in which the total length of the lens system is nevertheless short and compact.

2. Description of the Prior Art

In order to minimize the bulk and size of the camera, a demand has arisen for a compact photographic objective whose length from the first lens surface to the focal plane, or the total length of the lens system, is short. Particularly desirable is an objective with a lens system whose total length is in the order of its focal length. To obtain such a lens system, it is expedient to make the front group of the lens system of a positive refractive power and the rear group of a negative refractive power, or to employ a so-called telephoto type arrangement. The telephoto type of arrangement has been used in many photographic objectives of long focal lengths with relatively narrow angular fields, but has found very little use in objectives of wider than standard angular fields. The reason is that with the power distribution of a telephoto type arrangement, as the angle of the view field increases, distortion and astigmatism increase, and they become difficult to correct.

Japanese Pat. Sho Nos. 44-10831 and 52-48011 propose photographic objectives of the telephoto type which attempt to increase the angular field. The former has a relatively narrow angular field of about 46°, and the latter, though having a relatively wide angular field at 63° is slow, with an F-number of 4.5.

On the other hand, in telephoto type wide angle objectives, the positioning error of the front lens group in a direction perpendicular to the optical axis, or so-called parallel decentering error, causes an extraordinary decrease in the imaging performance. In the paraxial region particularly, uniform coma is produced, and the intermediate zone of the field has an unsymmetrical blur, thus extraordinarily lowering the image quality over the entire area of the picture frame. In the telephoto type of lens system, therefore, it is of great importance to choose a lens configuration and a refractive power distribution which allows for the assembling error to influence the result as little as possible.

Other prior techniques of interest of the invention of the present patent application appear in Japanese Laid Open Pat. Sho Nos. 50-145226 and 50-145227 and Japanese Pat. Sho No. 56-50248.

SUMMARY OF THE INVENTION

It is an object of the present invention to provide a photographic objective with a lens system whose total length is shortened to a compactness and which is fast with a wide angular field, while still permitting the loss of the image quality due to the assembling error to be as small as possible.

DETAILED DESCRIPTION OF THE PREFERRED EMBODIMENTS

Figure 1:
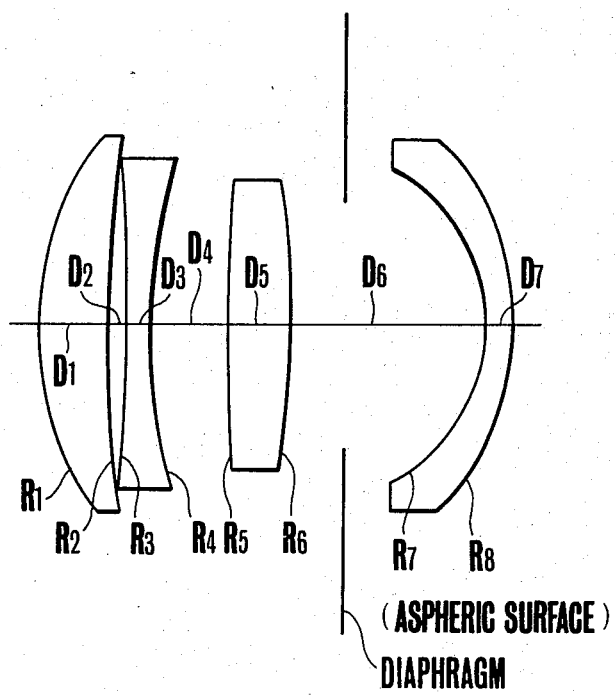
FIG. 1 is a lens block diagram of Example 1 of an embodiment of the present invention.

One of the features of a photographic objective for accomplishing the objective of the present invention is to use, from front to rear, a first lens of meniscus form convex toward the front having a positive refractive power, a second lens having a negative refractive power, a third lens having a positive refractive power, and a fourth lens of meniscus form concave toward the front having a negative refractive power, and to satisfy the following conditions:

$$-4 < f_4/f < -1.3 \quad (1)$$
$$-1.1 < \beta_4 < 1.4 \quad (2)$$
$$0.2 < D_6/f < 0.3 \quad (3)$$

$$-0.5 < \frac{R_6 + R_5}{R_6 - R_5} < 0 \quad (4)$$

$$1.7 < N_3 \quad (5)$$

where f is the focal length of the entire lens system;
f4 is the focal length of the fourth lens;
β4 is the image magnification by the fourth lens;
D6 is the axial air separation between the third and fourth lenses;
R5 and R6 are the radii of curvature of the front and rear surfaces of the third lens respectively; and
N3 is the refractive index of the glass of the third lens.

Preferably, the following conditions are also satisfied: As the front surface of the fourth lens is made aspheric, an equation for that aspheric surface is defined by extending an x-axis in the optical axis, a y-axis along a direction perpendicular to the optical axis, the direction in which light advances as positive, and the vertex of the surface in the x-axis as the original point, and letting R7 denote the radius of curvature of the paraxial region of the aspheric surface, with the coefficients for the even number-order terms, bi the coefficients for the odd number-order terms and Δx the difference between the aspheric surface and a spherical surface of which the paraxial region is in common to that of the aspheric surface in a direction parallel to the x-axis, the equation being expressed in the expansion form:

$$\Delta x = \frac{(1/R7^*) \cdot y^2}{1 + \sqrt{1 - (y/R7^*)^2}} + a_1 y^2 + a_2 y^4 + a_3 y^6 + a_4 y^8 +$$

$$a_5 y^{10} + b_1 y^3 + b_2 y^5 + b_3 y^7 + b_4 y^9 - \frac{(1/R7)^2}{1 + \sqrt{1 - (y/R7)^2}}$$

where R7* is defined in the form of $$R7 = \frac{1}{\frac{1}{R7^*} + 2a_1}$$

Hence we have the following conditions to be satisfied:

$$-5 \times 10^{-3} < \frac{\Delta x[0.7R7]}{f} < 5 \times 10^{-3} \quad (6)$$

$$-5 \times 10^{-4} < \frac{\Delta x[0.5R5]}{f} < 5 \times 10^{-4} \quad (7)$$

where $\Delta x[0.7R7]$ and $\Delta x[0.5R5]$ are the values of $\Delta x$ at the heights of $|R7| \times 0.7$ and $|R7| \times 0.5$ in the y-ordinate respectively.

Each of the above-cited conditions is explained below.

Conditions (1), (2) and (3) serve to shorten the total length of the lens system and at the same time achieve as small a loss as possible in the imaging performance due to the assembling error. In general, as the total length of the lens system is made shorter, the positive refractive power of the front lens group and the negative refractive power of the rear lens group both get stronger with an increase in the influence of the assembling error on the imaging performance. In particular the parallel decentering of the front lens group causes uniform coma in the image on the optical axis, and unsymmetric blur in the intermediate zone of the image in the picture frame area so that the resolving power and contrast are extraordinarily lowered. It is, therefore, of great importance to obtain a design of the lens system which is less sensitive to the assembling error.

Condition (1) has, because of this, to impart into the fourth lens an appropriate range of focal lengths. When a strong negative refractive power in excess of the upper limit is given, though the total length of the lens system becomes shorter, the loss in the imaging performance due to the parallel decentering of the front group is objectionably increased. Thus, such configuration is not practically acceptable from the lens manufacturing standpoint. When the lower limit is exceeded, as a weak negative refractive power results, the total length of the lens system becomes elongated, causing a lack of compactness, and further the Petzval sum is increased in a positive direction, with an increase of the field curvature in the intermediate zone of the picture area in the negative sense, causing a loss in the flatness of the image surface.

Figure 2:
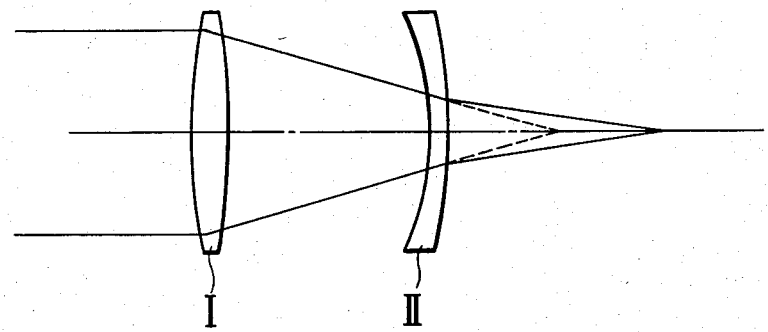
FIGS. 2(a) and 2(b) are geometrical diagrams to explain a result from the parallel decentering error of the front group of the lens system.
Figure 2:
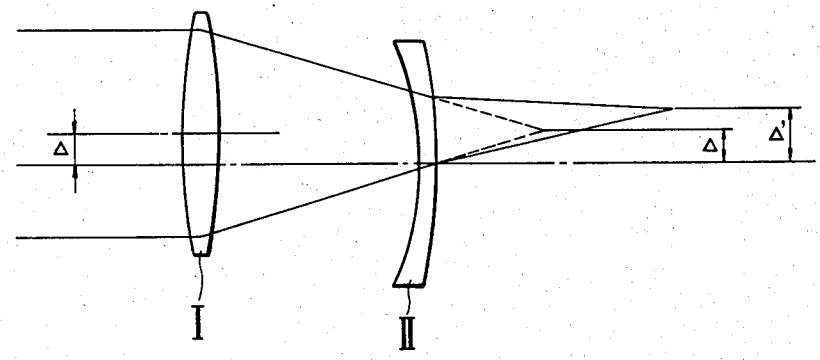
Figures 3A, 3B, 3C:
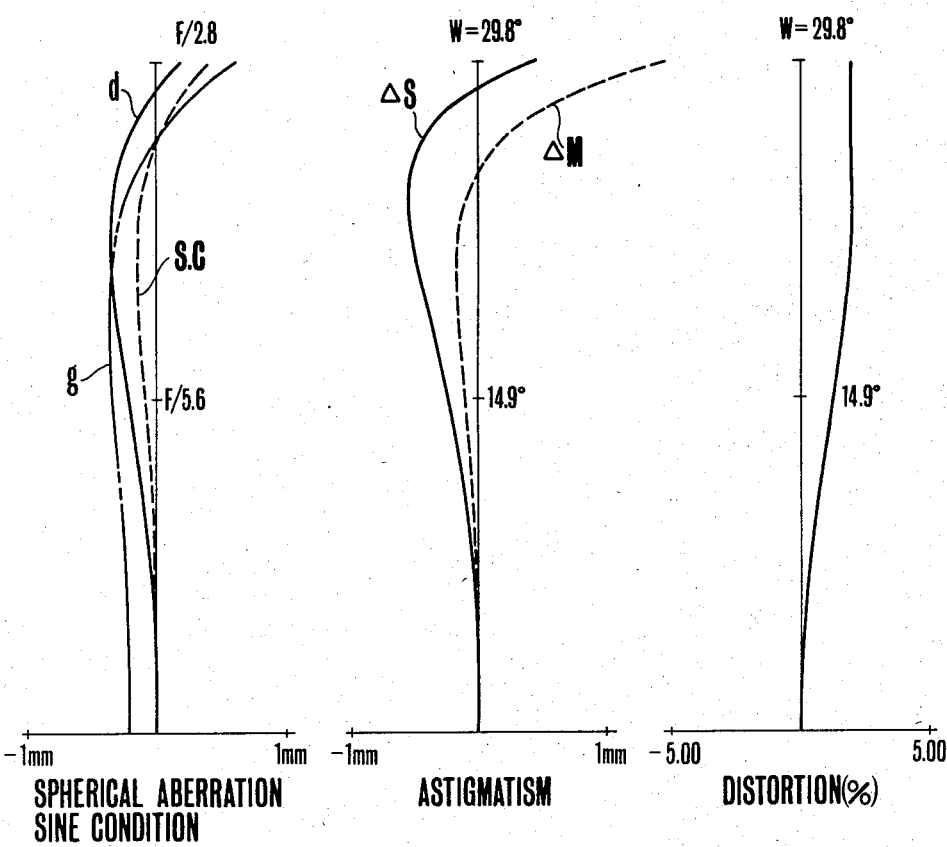
FIGS. 3-a to c, to 6-a to c are graphic representations of the various aberrations of Examples 1 to 4 of specific objectives of the invention respectively.
Figures 4A, 4B, 4C:
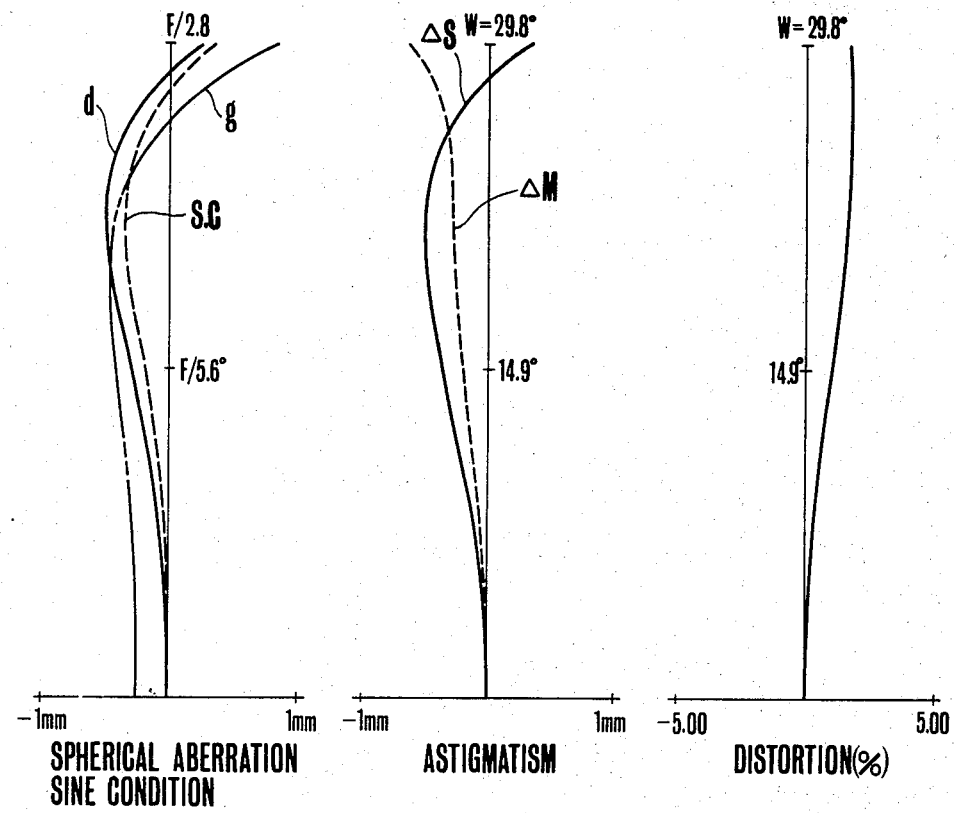
Figure 5A:
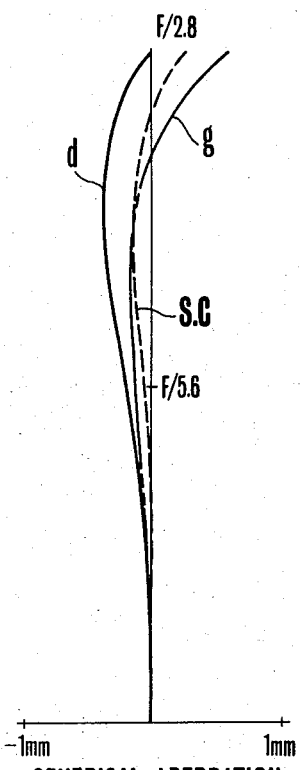
Figure 5B:
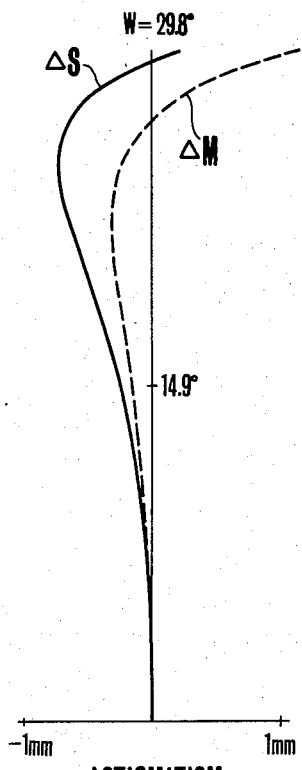
Figure 5C:
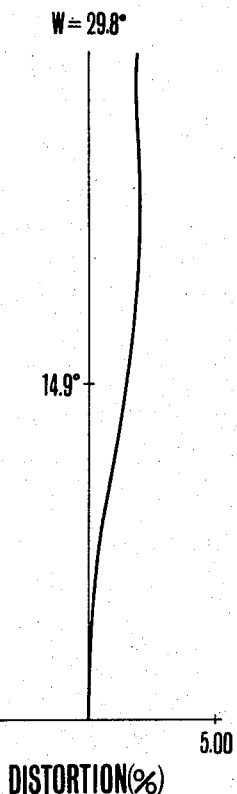

Condition (2) has, in accompaniment of condition (1), to limit the image magnification of the fourth lens so that the loss of the imaging performance due to the parallel decentering of the front group is lessened. In this connection, it should be explained by reference to FIGS. 2(a) and 2(b). FIGS. 2(a) and 2(b) illustrate an outlined configuration of the front and rear groups I and II of the invention, with FIG. 2(a) representing an ideal alignment of the front and rear groups I and II on a common optical axis, and FIG. 2(b) representing a parallel decentering of the front group I with reference to the rear group II by an erroneous difference, $\Delta$. It is to be understood from FIG. 2(b) that an image formed by the front group I is made to shift perpendicularly to the optical axis by a distance equal to $\Delta$ and further that, as the image is focused by the rear group II on the film plane on an enlarged scale, the object point on the optical axis is transferred to an image point on the film plane as shifted by an amount, $\Delta'$, $$\Delta' = \beta 4 \cdot \Delta$$

Therefore, when the front group I is parallel-decentered by the distance, $\Delta$, the image shifts by the above-defined $\Delta'$. This leads to a lower image quality. In other words, the parallel decentering of the front group gives rise to uniform coma in the central region of the area an the picture frame, and of unsymmetrical blurred image in the intermediate by the inclination of the image surface. In particular, the field curvature and others which are so-called longitudinal aberrations are proportional to the square of the image magnifications $\beta 4$. Accordingly, the image magnification $\beta 4$ is preferably taken at as small a value as possible. However, when the image magnification exceeds the lower limit of condition (2), the total length of the lens system is increased with consequent lack of compactness, and the Petzval sum is increased toward the positive direction so that a loss in the flatness of the image surface results. When the upper limit is exceeded, a slight parallel-decentering of the front group is occasion for a remarkable loss in the imaging performance.

Condition (3) represents a factor defining the air separation between the front and rear groups of the lens system. It is of importance to satisfy condition (3) in combination with conditions (1) and (2). When the upper limit is exceeded, the total length of the lens system is elongated with consequent lack of compactness, and the Petzval sum is increased with the loss of flatness of the image surface. When the lower limit is exceeded, while the total length of the lens system is shortened, the loss in imaging performance due to the parallel decentering of the front group becomes prominent.

Conditions (4) and (5) concern primary aberrations of the lens system.

Condition (4) represents a factor for configuration of the third lens and serves to achieve good correction of spherical aberration and coma. When the upper limit is exceeded, the spherical aberration is over-corrected, and inward coma is produced. When the lower limit is exceeded, the spherical aberration is under-corrected, and outward coma is produced.

Condition (5) involves restricting the refractive index of the glass from which the third lens is made, and serves to achieve a good correction of field curvature and astigmatism. When the refractive index N3 is not more than 1.7, the Petzval sum is increased with accompanying deterioration in the flatness of the image surface in the intermediate region of the area of the picture frame, and astigmatism is also increased.

The present invention serves, in addition to satisfying the above-described various conditions, to further make the first surface of the fourth lens aspheric with the advantage that the off-axis aberrations which would otherwise, with only a spherical system, be difficult to correct are well corrected.

Conditions (6) and (7) operate to restrict the aspheric quantity of the first surface of the fourth lens. When the upper limit of condition (6) is exceeded, it is impossible to correct positive distortion. When the lower limit is exceeded, while distortion can be corrected, over-correction of sagittal image surface results, and further inward coma is objectionably produced. Condition (7) serves to well correct aberrations in the intermediate zone of the area of the picture frame. When the upper limit is exceeded, halo is produced in the intermediate zone and under-correction of spherical aberration results. When the lower limit is exceeded, under-correction of meridional image surface results, and the astigmatic difference is increased, and inward coma is also produced.

It should be pointed out that, since, in the present invention, the first surface of the fourth lens using the aspheric surface is positioned relatively near to the image plane, the area of the surface of the fourth lens through which the rays of light corresponding to all the image points pass is relatively small. As the surface accuracy of the fourth lens considerably is moderated, it becomes possible, instead of the glass material, to use a plastic molding and make the fourth lens inexpensively.

Also, focusing of the objective of the invention may be carried out either by manually moving the entire lens system which is the common practice in the art, or by imparting independent movement to the first to third lenses while the fourth lens remains stationary.

Four examples of specific objectives of the invention can be constructed in accordance with the numerical data given in the following tables for the radius of curvature of the i-th surface Ri counting from the front, the axial thickness or air separation Di between the i-th and (i+1)th lens surfaces, and the refractive index Ni and Abbe number Vi of the glass from which the i-th lens element counting from the front is made respectively.

EXAMPLE 1

Focal Length F = 100  F-number = 1:2.8  Image Angle $2\omega$ = 59.0°

| | | | |
|---|---|---|---|
| R1 = 33.67 | D1 = 8.21 | N1 = 1.77250 | V1 = 49.6 |
| R2 = 140.66 | D2 = 2.24 | N2 = 1.78472 | V2 = 25.7 |
| R3 = −177.92 | D3 = 2.65 | N3 = 1.80610 | V3 = 40.9 |
| R4 = 63.11 | D4 = 8.99 | N4 = 1.49171 | V4 = 57.4 |
| R5 = 185.28 | D5 = 7.42 | | |
| R6 = −96.48 | D6 = 22.86 | | |
| R7* = −19.52 | D7 = 3.18 | | |
| R8 = −28.24 | | | |

Aspheric Coefficient:

| | |
|---|---|
| $a_1 = -4.582 \times 10^{-4}$ | $b_1 = -1.736 \times 10^{-5}$ |
| $a_2 = 2.697 \times 10^{-6}$ | $b_2 = -3.796 \times 10^{-7}$ |
| $a_3 = 1.895 \times 10^{-8}$ | $b_3 = 3.100 \times 10^{-9}$ |
| $a_4 = -1.971 \times 10^{-10}$ | $b_4 = -5.364 \times 10^{-12}$ |
| $a_5 = 5.272 \times 10^{-13}$ | |

EXAMPLE 2

Focal Length F = 100  F-number = 1:2.8  Image Angle $2\omega$ = 59.0°

| | | | |
|---|---|---|---|
| R1 = 32.63 | D1 = 8.17 | N1 = 1.77250 | V1 = 49.6 |
| R2 = 110.23 | D2 = 2.64 | N2 = 1.76182 | V2 = 26.6 |
| R3 = −146.05 | D3 = 2.64 | N3 = 1.80610 | V3 = 40.9 |
| R4 = 53.99 | D4 = 7.78 | N4 = 1.49171 | V4 = 57.4 |
| R5 = 129.05 | D5 = 5.54 | | |
| R6 = −91.20 | D6 = 24.36 | | |
| R7* = −19.50 | D7 = 3.16 | | |
| R8 = −27.21 | | | |

Aspheric Coefficient:

| | |
|---|---|
| $a_1 = -2.157 \times 10^{-4}$ | $b_1 = -2.631 \times 10^{-5}$ |
| $a_2 = 6.903 \times 10^{-6}$ | $b_2 = -6.241 \times 10^{-7}$ |
| $a_3 = 1.247 \times 10^{-8}$ | $b_3 = 3.341 \times 10^{-9}$ |
| $a_4 = -1.795 \times 10^{-10}$ | $b_4 = -4.787 \times 10^{-12}$ |
| $a_5 = 4.700 \times 10^{-13}$ | |

EXAMPLE 3

Focal Length F = 100  F-number = 1:2.8  Image Angle $2\omega$ = 59.0°

| | | | |
|---|---|---|---|
| R1 = 33.87 | D1 = 8.21 | N1 = 1.77250 | V1 = 49.6 |
| R2 = 124.31 | D2 = 2.19 | N2 = 1.78472 | V2 = 25.7 |
| R3 = −198.26 | D3 = 2.65 | N3 = 1.72000 | V3 = 50.2 |
| R4 = 69.36 | D4 = 11.23 | N4 = 1.49171 | V4 = 57.4 |
| R5 = 132.77 | D5 = 3.31 | | |
| R6 = −108.05 | D6 = 23.70 | | |
| R7* = −19.48 | D7 = 3.18 | | |
| R8 = −28.30 | | | |

Aspheric Coefficient:

| | |
|---|---|
| $a_1 = -5.140 \times 10^{-4}$ | $b_1 = -1.979 \times 10^{-5}$ |
| $a_2 = 1.838 \times 10^{-6}$ | $b_2 = -3.441 \times 10^{-7}$ |
| $a_3 = 2.060 \times 10^{-8}$ | $b_3 = 3.124 \times 10^{-9}$ |
| $a_4 = -1.990 \times 10^{-10}$ | $b_4 = -5.586 \times 10^{-12}$ |
| $a_5 = 5.105 \times 10^{-13}$ | |

EXAMPLE 4

Focal Length F = 100  F-number = 1:2.8  Image Angle $2\omega$ = 59.0°

| | | | |
|---|---|---|---|
| R1 = 34.38 | D1 = 8.20 | N1 = 1.77250 | V1 = 49.6 |
| R2 = 110.67 | D2 = 3.49 | N2 = 1.76182 | V2 = 26.6 |
| R3 = −184.09 | D3 = 2.65 | N3 = 1.80610 | V3 = 40.9 |
| R4 = 50.22 | D4 = 8.01 | N4 = 1.49171 | V4 = 57.4 |
| R5 = 115.31 | D5 = 5.56 | | |
| R6 = −107.02 | D6 = 25.97 | | |
| R7* = −20.09 | D7 = 3.17 | | |
| R8 = −24.71 | | | |

Aspheric Coefficient:

| | |
|---|---|
| $a_1 = 4.422 \times 10^{-4}$ | $b_1 = -5.585 \times 10^{-5}$ |
| $a_2 = 5.967 \times 10^{-6}$ | $b_2 = -4.613 \times 10^{-7}$ |
| $a_3 = 1.353 \times 10^{-8}$ | $b_3 = 3.007 \times 10^{-9}$ |
| $a_4 = -1.928 \times 10^{-10}$ | $b_4 = -5.191 \times 10^{-12}$ |
| $a_5 = 4.639 \times 10^{-13}$ | |

What is claimed is:

1. A compact photographic objective comprising:
   four lenses, from front to rear,
   the first lens being a positive meniscus lens convex toward the front;
   the second lens being a negative lens;
   the third lens being a positive lens;
   the fourth lens being a negative meniscus lens concave toward the front; and
   said lenses satisfying the following conditions:

$$-4 < f4/f < -1.3$$

$$1.1 < \beta 4 < 1.4$$

$$0.2 < D6/f < 0.3$$

$$-0.5 < \frac{R6 + R5}{R6 - R5} < 0$$

$$1.7 < N3$$

wherein f is the focal length of the entire lens system; R5 and R6 are the radii of curvature of the first and second surfaces of the aforesaid third lens;

N3 is the refractive index of the glass from which the same lens is made up;

D6 is the air separation between the aforesaid third lens and the aforesaid fourth lens;

f4 is the focal length of the aforesaid fourth lens; and

β4 is the image magnification of the fourth lens.

2. A compact photographic objective according to claim 1, wherein said fourth lens has a first surface which is aspheric, and wherein an equation for said aspheric surface is expressed by taking an x-axis along the optical axis, a y-axis along a direction perpendicular to the optical axis, the direction in which light advances are positive, and the vertex of the surface on the x-axis as the original point, and letting R7 denote the radius of curvature of the first surface of the aforesaid fourth lens, ai the coefficients of the even number-order terms, bi the coefficients of the odd number-order terms, and Δx the difference between the aspheric surface of said fourth lens and the aspheric surface which contributes to the determination of the focal length, with the equation having the form:

$$\Delta x = \frac{(1/R7^*) \cdot y^2}{1 + \sqrt{1 - (y/R7^*)^2}} + a_1 y^2 + a_2 y^4 + a_3 y^6 + a_4 y^8 + a_5 y^{10} + b_1 y^3 + b_2 y^5 + b_3 y^7 + b_4 y^9 - \frac{(1/R7)y^2}{1 + \sqrt{1 - (y/R7)^2}}$$

where R7* is defined by $$R7 = \frac{1}{\frac{1}{R7^*} + 29_1},$$

the following conditions are satisfied:

$$-5 \times 10^{-3} < \frac{\Delta x[0.7R7]}{f} < 5 \times 10^{-3}$$

$$-5 \times 10^{-4} < \frac{\Delta x[0.5R5]}{f} < 5 \times 10^{-4},$$

and
where Δx[0.7R7] and Δx[0.5R5] are the values of the Δx at the heights of |R7|×0.7 and |R7|×0.5 in the y-ordinate respectively.

* * * * *